US010760813B2

(12) United States Patent
Uselton et al.

(10) Patent No.: US 10,760,813 B2
(45) Date of Patent: Sep. 1, 2020

(54) OPTIMIZED LOW POWER AIR CIRCULATION IN HVAC SYSTEMS

(71) Applicant: Lennox Industries Inc., Richardson, TX (US)

(72) Inventors: Robert B. Uselton, Plano, TX (US); Ian James Burmania, Rockwall, TX (US)

(73) Assignee: Lennox Industries Inc., Richardson, TX (US)

( * ) Notice: Subject to any disclaimer, the term of this patent is extended or adjusted under 35 U.S.C. 154(b) by 261 days.

(21) Appl. No.: 15/257,954

(22) Filed: Sep. 7, 2016

(65) Prior Publication Data

US 2018/0066864 A1 Mar. 8, 2018

(51) Int. Cl.

| F24F 11/77 | (2018.01) |
|---|---|
| F04D 27/00 | (2006.01) |
| F24F 11/30 | (2018.01) |
| F24F 11/79 | (2018.01) |
| F24F 11/46 | (2018.01) |
| F04D 29/48 | (2006.01) |
| F24D 5/04 | (2006.01) |
| F24F 7/06 | (2006.01) |
| F24F 110/10 | (2018.01) |

(52) U.S. Cl.
CPC ............ *F24F 11/77* (2018.01); *F04D 27/004* (2013.01); *F04D 29/483* (2013.01); *F24D 5/04* (2013.01); *F24F 11/30* (2018.01); *F24F 11/46* (2018.01); *F24F 11/79* (2018.01); *F05B 2240/30* (2013.01); *F24F 7/065* (2013.01); *F24F 2110/10* (2018.01); *F24F 2221/34* (2013.01); *F24F 2221/54* (2013.01)

(58) Field of Classification Search
CPC .. F24F 11/77; F24F 11/30; F24F 11/79; F24F 11/46; F24F 7/065; F24F 110/10; F24F 2221/34; F24F 2221/54; F04D 27/004; F04D 29/483; F05B 2240/30
USPC ........................................................ 454/229
See application file for complete search history.

(56) References Cited

U.S. PATENT DOCUMENTS

| 5,236,393 | A | * | 8/1993 | Milewski | ................ | F24F 7/065 |
|---|---|---|---|---|---|---|
| | | | | | | 454/266 |
| 5,413,165 | A | * | 5/1995 | Wylie | ..................... | F24F 3/044 |
| | | | | | | 165/208 |
| 6,079,626 | A | * | 6/2000 | Hartman | ................. | F24F 3/044 |
| | | | | | | 236/13 |

(Continued)

*Primary Examiner* — Steven B McAllister
*Assistant Examiner* — Allen R Schult
(74) *Attorney, Agent, or Firm* — Baker Botts L.L.P.

(57) ABSTRACT

A system comprising a furnace, an impeller, and a controller. The impeller directs air into an environment through the furnace. The controller receives calls to heat the environment or circulate air in the environment. In response to receiving a call to heat the environment, the controller activates the furnace and the impeller such that the impeller draws a first amount of power and turns in a first direction causing air to be impelled from the impeller through the furnace into the environment. In response to receiving a call to circulate air in the environment, the controller activates the impeller such that the impeller draws a second amount of power and turns in a second direction causing air to be impelled from the impeller into the environment, wherein the second amount of power is less than the first amount of power and the second direction is opposite the first direction.

20 Claims, 3 Drawing Sheets

(56) References Cited

U.S. PATENT DOCUMENTS

2005/0125102 A1\* 6/2005 Nichols .................. G05B 15/02
                                                        700/276
2016/0084268 A1\* 3/2016 Cocks .................... H02P 23/00
                                                        415/1

\* cited by examiner

OPTIMIZED LOW POWER AIR CIRCULATION IN HVAC SYSTEMS

TECHNICAL FIELD OF THE INVENTION

This disclosure relates generally to HVAC (heating, ventilating, and air conditioning) systems, and more specifically to systems and methods for optimized low power air circulation in HVAC systems.

BACKGROUND OF THE INVENTION

HVAC systems are sometimes used to heat, cool, and ventilate an environment such as a residence or commercial building. In a heating cycle, the HVAC system activates a furnace to heat air proximate the furnace. A fan then circulates the heated air throughout the environment.

SUMMARY OF THE INVENTION

A system comprising a furnace, a blower comprising an impeller, and a controller is disclosed. The blower is operable to direct air into an environment through the furnace. The controller receives calls to either heat the environment or circulate air in the environment. In response to receiving a call to heat the environment, the controller activates the furnace and the impeller such that the impeller draws a first amount of power and turns in a first direction causing air to be impelled from the impeller and traverse the furnace before entering the environment. In response to receiving a call to circulate air in the environment, the controller is operable to activate the impeller such that the impeller draws a second amount of power and turns in a second direction causing air to be impelled from the impeller and into the environment, wherein the second amount of power is lower than the first amount of power and the second direction is opposite the first direction.

Particular embodiments present several technical advantages. In particular, in one embodiment, an HVAC system uses impellers with curved blades that can be rotated in a clockwise or counter-clockwise direction depending upon user and temperature inputs. Further, the system includes a controller that can select the speed and direction of rotation of the impeller. These features enable the impeller to rotate in the direction that provides the most appropriate power use for different operating modes. For example, a forward-curved impeller may rotate in a clockwise direction at one speed and in a counter-clockwise direction at another speed to reduce the power consumption of the overall HVAC system. The disclosed system thus allows for a robust and efficient HVAC system.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

For a more complete understanding of the present disclosure and the advantages thereof, reference is now made to the following Detailed Description taken in conjunction with the accompanying drawings, in which.

DETAILED DESCRIPTION OF THE INVENTION

Figure 1:
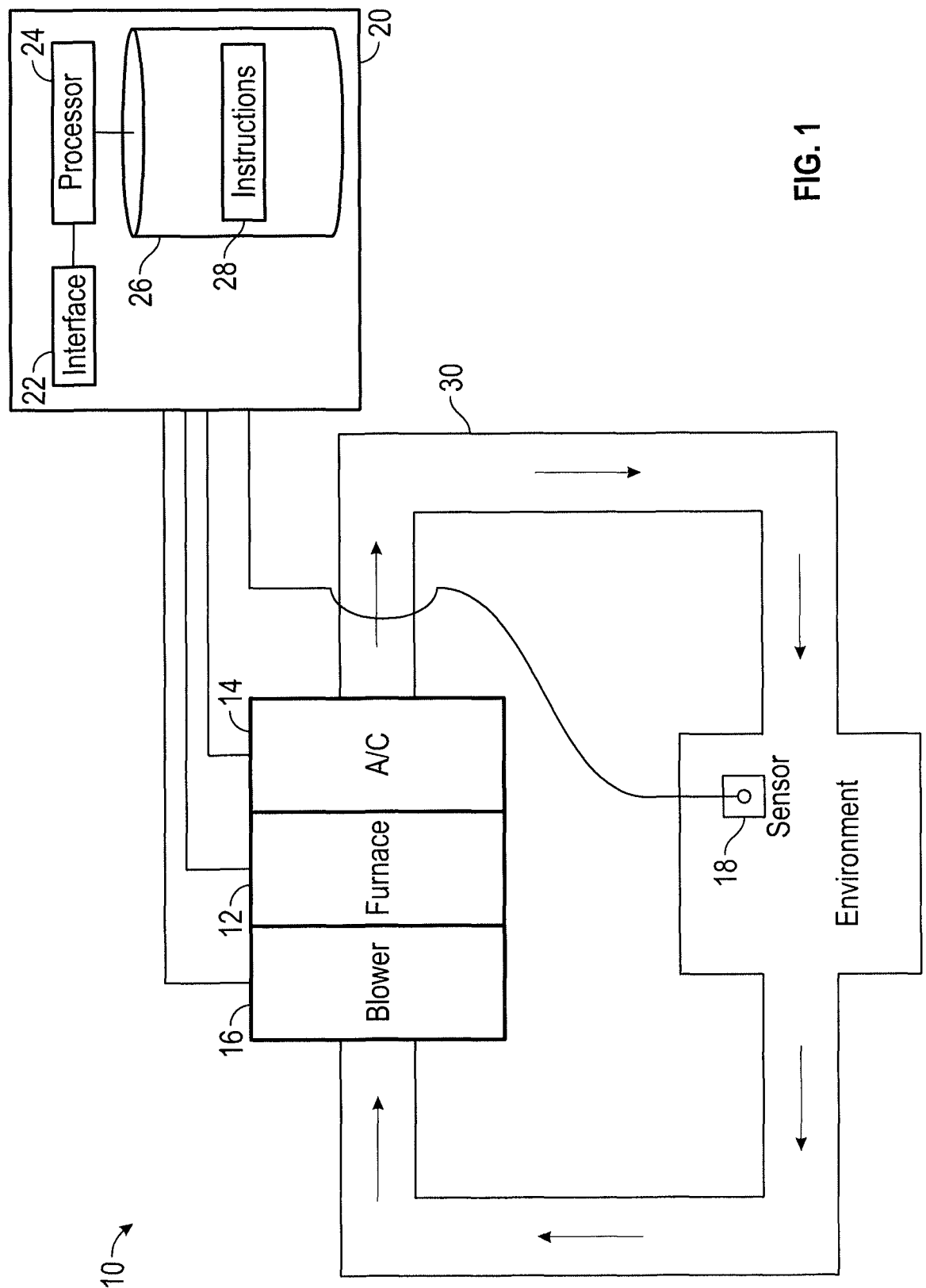
FIG. 1 illustrates a general overview of an HVAC system according to one embodiment of the present disclosure.
Figure 2A:
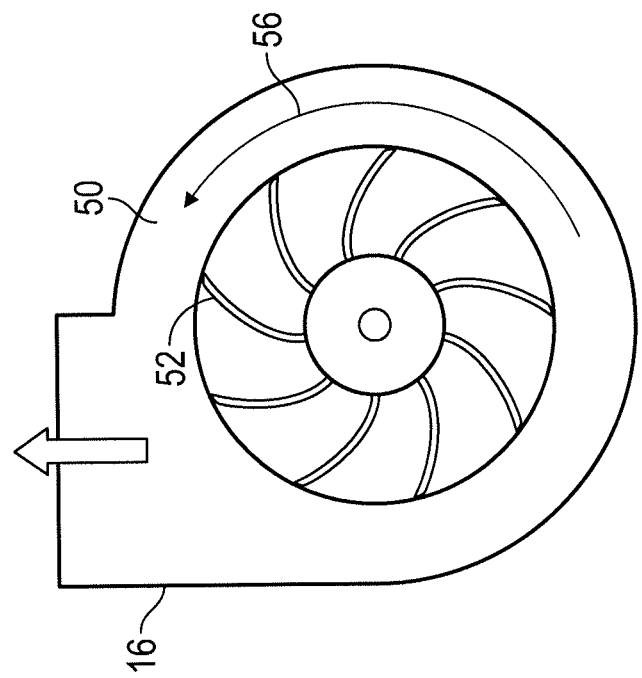
FIG. 2A illustrates a forward-curved impeller rotating in a first direction
Figure 2B:
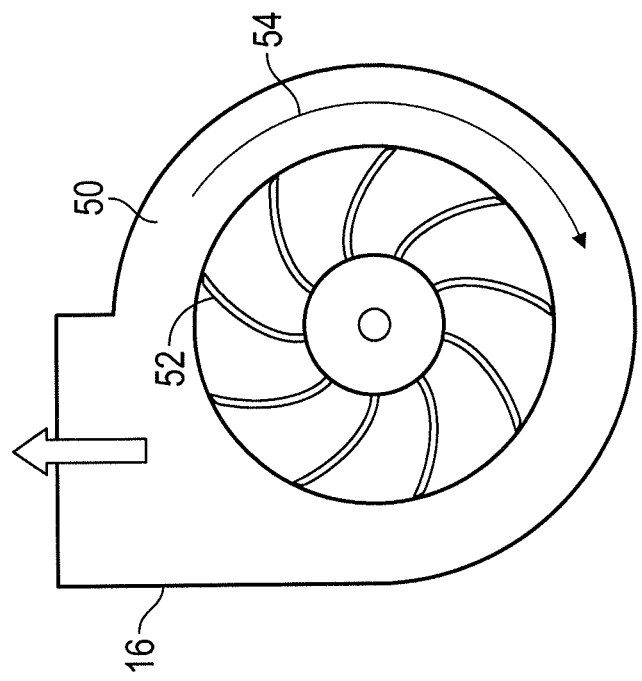
FIG. 2B illustrates a forward-curved impeller rotating in a second direction.
Figure 3:
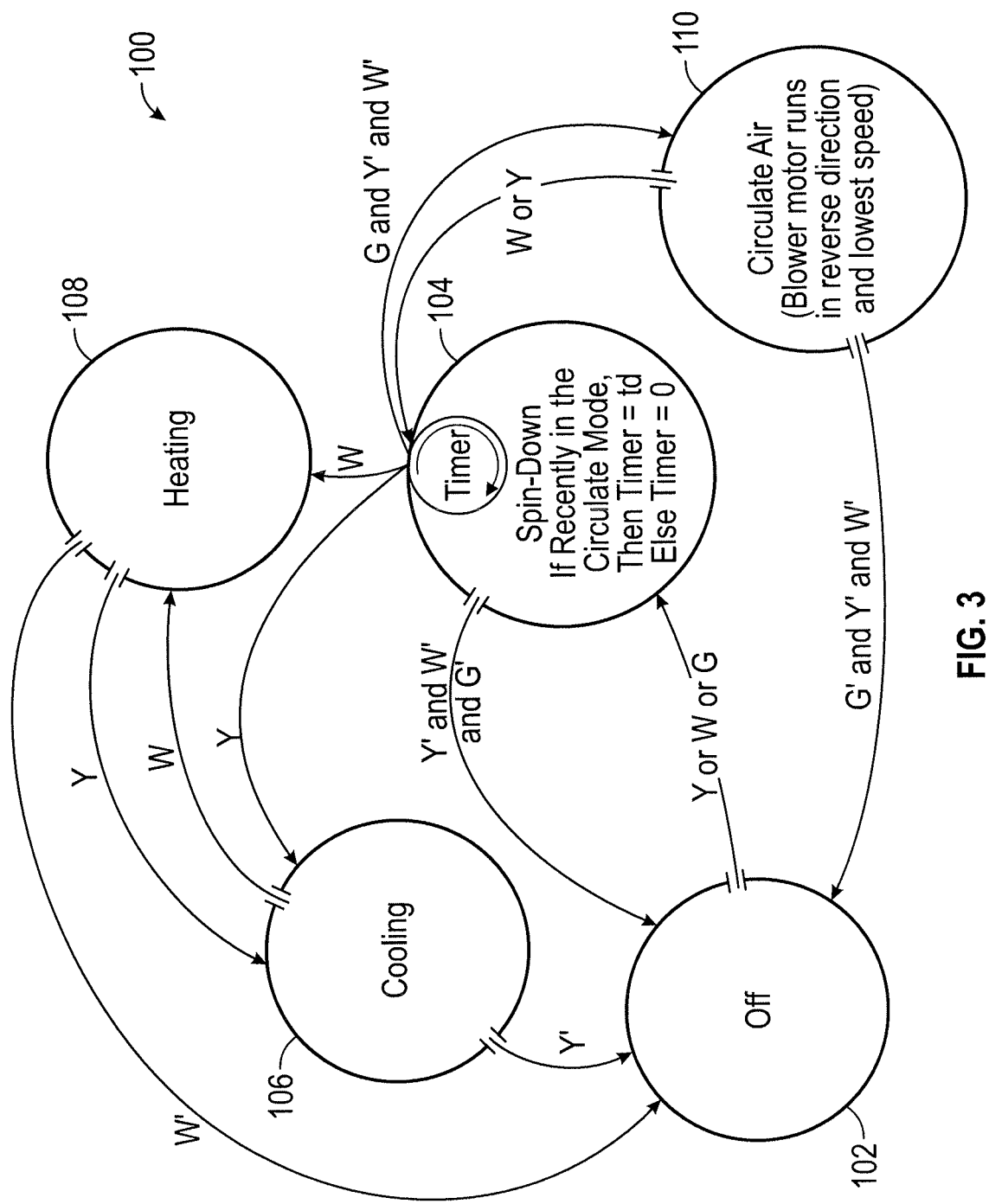
FIG. 3 illustrates a state diagram characterizing one embodiment of the operation of a controller.

Embodiments of the present disclosure and its advantages are best understood by referring to FIGS. 1 through 3 of the drawings, like numerals being used for like and corresponding parts of the various drawings.

HVAC systems are commonplace in homes and industrial settings. Such systems regulate the air quality and temperature of the environment in which they are installed. In some HVAC systems, a user may set a furnace at a user-defined temperature to keep the environment at or above that temperature. The HVAC system may keep the environment at that temperature by directing warm air from the furnace into ducts that guide the air to a suitable location. For example, in a home, a furnace may warm air using a heat exchanger and then push that warm air into ducts that release the warm air into the various rooms of the home through vents.

Similarly, HVAC systems may be used to cool an environment by using an air conditioner. In such HVAC systems, a user may set the air conditioner at a user-defined temperature to keep the environment at or below that temperature. The HVAC system may keep the environment at or below that temperature by directing cool air from the air conditioner into ducts that guide the air to a suitable location.

HVAC systems can also be used to ventilate an environment. In ventilation or circulation mode, the HVAC system directs air into the environment without either cooling or heating it. Different HVAC systems use different types of fans and blowers to direct the flow of air. For example, some HVAC systems use propeller fans while others use impeller-type blowers to direct airflow. Propellers direct airflow by drawing air in and pushing it along an axial path. Impellers, on the other hand, direct airflow by drawing in air along one axis and slinging it out along an axis perpendicular to the intake axis. Using impellers in HVAC systems offers several advantages including smaller size and higher pressure capability. The most common type of electrical motor used to power small propeller and blowers is the single-phase, permanent split capacitor (PSC) AC induction motor.

However, there are some drawbacks of using these induction motors in an HVAC system. One key drawback of using PSC motors is that they operate inefficiently at low speeds and must therefore operate at a relatively high speed to be efficient. Thus, at lower speeds, blowers generate less airflow but at much lower overall efficiency. This characteristic of PSC motor/blowers is generally acceptable when an HVAC system is being used to heat or cool an environment because raising or cooling the temperature of an environment typically requires high airflow so the blower needs to run at higher speeds to accomplish those tasks. However, when an PSC motor/blower is being used only to circulate air in an environment, the HVAC system typically does not need to generate high airflow. But, because PSC motor/blowers are inefficient at lower speeds, HVAC systems consume considerable power even when the quantity of air circulation has been significantly reduced.

The present disclosure discloses systems and methods for overcoming this drawback of PSC motor/blower-based HVAC systems. In one embodiment, an HVAC system uses a controller coupled to a PSC motor/blower with either forward-curved or backward-curved blades. The controller regulates the speed and direction in which the impeller operates. As such, the controller is able to direct the impeller to move in a clockwise direction or a counter-clockwise direction. Further, the controller is also able to direct the impeller to move at different speeds. When the HVAC system is being used to cool or heat the environment, the controller directs the impeller to move in a first direction, for example, a clockwise direction, at relatively high speeds. Further, when the HVAC system is being used to only circulate air in the environment without cooling or heating the environment, the controller directs the impeller to move in a second direction opposite the first direction, for example in a counter-clockwise direction. Operating the impeller in this second direction unloads the PSC motor because the impeller is not as effective at moving air in this second direction. As such, the HVAC system uses less power than existing HVAC systems when running just to circulate air.

The present disclosure will be described in more detail using FIGS. 1 through 3. FIG. 1 illustrates a general overview of the HVAC system according to one embodiment of the present disclosure. FIGS. 2A and 2B illustrate a forward-curved impeller rotating in first and second directions. And FIG. 3 illustrates a state diagram characterizing one embodiment of the operation of a controller.

FIG. 1 illustrates a system 10 for heating, cooling, and ventilating an environment. System 10 comprises a furnace 12, an air conditioner 14, a blower 16, a sensor 18, and a controller 20. System 10 also illustrates ducts 30. Controller 20 includes an interface 22, a processor 24, and a memory 26. Controller 20 receives inputs from a user and information from sensor 18 and controls the operation of furnace 12, air conditioner 14, and blower 16. Blower 16 is operable to direct airflow into ducts 30.

Furnace 12 may be any device for high-temperature heating of fluids including, for example, water, air, steam, and other similar fluids. Furnace 12 may use any suitable fuel including oil, natural gas, coal, wood, among others. Furnace 12 may be of any suitable type including a natural draft furnace, a forced-air furnace, a forced draft furnace, a condensing furnace, or any other suitable furnace. Furnace 12 (in conjunction with blower 16 and ducts 30) may distribute heat throughout an environment such as a residence or commercial building in any suitable manner including through an intermediary medium such as hot water or steam. In one embodiment, furnace 12 may heat water or other liquids that heat air directed by blower 16 before that air is circulated in the environment.

Air conditioner 14 may be any electromechanical device for removing heat from an environment. Air conditioner 14 may comprise one or more compressors, condensing coils, and evaporating coils. A compressor may be any electromechanical unit operable to pump a refrigerant gas up to a high pressure and temperature and circulate the refrigerant through a condensing coil. A condensing coil may be any coil system for condensing the refrigerant and transporting it. The condensing coil may be coupled to the compressor so that the refrigerant may be transported from the compressor to the condensing coil and on to an evaporating coil. The evaporating coil may be any coil operable to allow the condensed refrigerant to expand. Evaporating coil may be coupled to condensing coil and compressor.

Blower 16 may be any electromechanical device for blowing air across furnace 12 or air conditioner 14 and into an environment such as a residence or commercial building. Blower 16 may be of any suitable type. In one embodiment, blower 16 is an impeller-blower that uses one or more induction motors coupled to an impeller to rotate the impeller. The impeller of blower 16 may be radial, forward-curved, or backward-curved. One embodiment of a forward-curved impeller according to the present embodiment is illustrated in FIGS. 2A and 2B and discussed in greater detail below. The motor of blower 16, coupled to the impeller, may be operable to rotate in a clockwise or counter-clockwise direction. Blower 16 may be coupled to any suitable type of motor including a PSC motor. Blower 16 may be powered by any suitable power source. Blower 16 may be single speed or multispeed. In system 10, blower 16 is coupled to one or more ducts 30. Blower 16 is operable to impel air into furnace 12 and/or air conditioner 14. Further, air is fed back into blower 16 via ducts 30.

Sensor 18 may be any sensor operable to measure the temperature of an environment, including, for example, a mercury or alcohol based thermometer. In some embodiments, sensor 18 may be an electronic temperature sensor. In various embodiments, sensor 18 may represent one or more temperature measuring devices. Sensor 18 may be positioned in any suitable location including inside a residence, inside a commercial building, inside particular sections of a residence or commercial building or in any other similar location.

Controller 20 may be any module operable to regulate the operation of furnace 12, air conditioner 14, and/or blower 16. Controller 20 may also be operable to receive temperature measurements from sensor 18. Controller 20 may regulate the operation of the various components of system 10 based on user input and/or temperature measurements from sensor 18. In one embodiment, controller 20 may regulate the amount of capacitance used with the PSC motor of blower 16. For example, controller 20 may use different capacitances with blower 16 depending on whether blower 16 is being used to heat an environment, cool the environment, or circulate air in the environment. Controller 20 may further comprise an interface 22, a processor 24, and a memory 26.

Interface 22 may be operable to receive information from and transmit information to the various components of system 10. Interface 22 may also communicate with processor 24 and memory 26. Interface 22 represents any port or connection, real or virtual, including any suitable hardware and/or software, including protocol conversion and data processing capabilities, to communicate through a LAN, WAN, or other communication system that allows central controller 20 to exchange information with furnace 12, air conditioner 14, blower 16, sensor 18, and/or any other components of system 10.

Processor 24 may be any electronic circuitry, including, but not limited to microprocessors, application specific integrated circuits (ASIC), application specific instruction set processor (ASIP), and/or state machines, that communicatively couples interface 22 and memory 26 and controls the operation of controller 20. In some embodiments, processor 24 may be single core or multi-core having a single chip containing two or more processing devices. Processor 24 may be 8-bit, 16-bit, 32-bit, 64-bit or of any other suitable architecture. Processor 24 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 24 may include other hardware and software that operates to control and process information. Processor 24 may execute computer-executable program instructions stored in memory 26. Processor 24 is not limited to a single processing device and may encompass multiple processing devices.

Memory 26 may include any one or a combination of volatile or non-volatile local or remote devices suitable for storing information. For example, memory 26 may include RAM, ROM, flash memory, magnetic storage devices, optical storage devices, network storage devices, cloud storage devices, solid state devices, or any other suitable information storage device or a combination of these devices. Memory 26 stores, either permanently or temporarily, data, operational software, other information for processor 24, other components of central controller 20, or other components of system 10. For example, memory 26 may store user preferences or default settings for operating controller 20. Memory 26 may store information in one or more databases, file systems, tree structures, relational databases, any other suitable storage system, or any combination thereof. Furthermore, different information stored in memory 26 may use any of these storage systems. The information stored in memory 26 may be encrypted or unencrypted, compressed or uncompressed, and static or editable. Memory 26 may store information in one or more caches. In one embodiment, memory 26 may store instructions 28 for controlling system 10. FIG. 3 illustrates a state diagram representing one embodiment of instructions 28.

In one embodiment of system 10, user inputs for controller 20 may comprise instructions to heat, cool, or ventilate the environment. So, for example, if a user setting calls for heating an environment when the environmental temperature drops below 70 degrees, and sensor 18 measures an environmental temperature of 68 degrees, instructions 28 may call for controller 20 to activate furnace 12 and blower 16 to raise the environmental temperature to 70 degrees. Similarly, if a user setting calls for cooling the environment when the environmental temperature rises above 80 degrees, and sensor 18 measures an environmental temperature of 82 degrees, instructions 28 may call for controller 20 to activate air conditioner 14 and blower 16 to lower the environmental temperature to 80 degrees. Additionally, if a user setting calls for ventilating the environment, instructions 28 may call for controller 20 to activate blower 16 and turn off furnace 12 and air conditioner 14.

In one embodiment, controller 20 may further regulate the speed and rotational direction of the impeller inside blower 16. In such an embodiment, controller 20 may adjust the speed of the blower depending on the user inputs and the temperature measurements from sensor 18. So, continuing the example above, if the user input calls for cooling the environment when the environmental temperature rises above 80 degrees, and sensor 18 measures an environmental temperature of 82 degrees, instructions 28 may call for controller 20 to rotate the impeller inside blower 16 in a clockwise direction at a high speed, e.g. a speed at or above 1000 rpm. Similarly, if the user input calls for heating the environment when the environmental temperature drops below 70 degrees, and sensor 18 measures an environmental temperature of 68 degrees, instructions 28 may call for controller 20 to rotate the impeller inside blower 16 in a clockwise direction at a high speed, e.g. a speed at or above 1000 rpm. In this manner, controller 18 can raise or lower the environmental temperature relatively quickly by directing a large airflow through furnace 12 or air conditioner 14.

In this embodiment, if the user setting calls for ventilating or circulating air in the environment, instructions 28 may call for controller 20 to direct the impeller inside blower 16 to rotate in a counter-clockwise direction. This is advantageous because an impeller as shown in FIG. 2, moves less air when it is rotating in a counter-clockwise direction. The induction motor will turn at a high speed but consume little electrical power because the impeller does not require as much mechanical power when it rotates in a counter-clockwise direction. In such an embodiment, controller 20 may also reduce the amount of capacitance used with a PSC blower 16 to reduce the power consumption of blower 16. In this manner, controller 20 reduces the power used by the overall HVAC system 10, when circulating air.

FIGS. 2A and 2B illustrates embodiments of a blower 16 with a forward-curved impeller 50. As shown, impeller 50 has forward-curved blades 52. In FIG. 2A, impeller 50 is shown rotating in a clockwise direction 54. In the present embodiment, impeller 50 rotates in the clockwise direction 54 when blower 16 is being used to heat or cool the environment using furnace 12 or air conditioner 14 respectively. In this configuration, blower 16 generates high airflow and operates efficiently at high speeds and inefficiently at lower speeds.

FIG. 2B illustrates the same impeller 50 of blower 16 moving in a counter-clockwise direction 56. In the present embodiment, impeller 50 rotates in the counter-clockwise direction 56 when blower 16 is being used to ventilate or circulate air through the environment without heating or cooling the air. In this configuration, blower 16 generates low airflow but also needs little power and lets the induction motor run at high speed.

FIG. 3 illustrates a state diagram 100 showing one embodiment of instructions 28. State diagram 100 uses the following nomenclature:

Y: call for turning air conditioner 14 on;
Y': call for turning air conditioner 14 off;
W: call for turning furnace 12 on;
W': call for turning furnace 12 off;
G: call for circulating air; and
G': call for stopping air circulation.

Starting at state 102 where system 10 is off, when controller 20 receives a call for heating W, cooling Y, or circulation G, system 10 exits state 102 and enters state 104. In state 104, system 10 is in a spin-down mode where system 10 injects a predetermined time delay, for example 0-30 seconds, to allow blower 16 to stop rotating. When system 10 enters spin-down state 104 from the off state 102, system 10 moves on to the next state either immediately or after a time delay to allow blower 16 to stop rotating. If system 10 received a call for cooling Y, then system 10 moves on to state 106 where the system turns on air conditioner 14 and blower 16. In one embodiment, in state 106, controller 20 turns blower 16 on in a clockwise direction at a high speed. When system 10 is in state 106 and receives a call Y' for turning cooling off, the system returns to off state 102 and the system 10 turns off.

Analogously, if system 10 received a call for heating W while in off state 102, system 10 moves to state 104. Depending upon how long it has been since system 10 was last in state 110, system 10 moves on to state 108 either immediately or after a time delay. In state 108 the controller 20 turns on furnace 12 and blower 16. Here too, in one embodiment, in state 106, controller 20 turns blower 16 on in a clockwise direction at a high or medium speed. When system 10 is in state 108 and receives a call W' for turning heating off, the system returns to off state 102 and the system 10 turns off.

Returning to state 106, if the system receives a call for heating W, system 10 moves into heating 108 where controller 20 turns air conditioner 12 off and turns furnace 12 on. Controller 20 continues to operate blower 16 in a clockwise direction at a high speed or medium speed. If, while system 10 is in heating state 108, system 10 receives a call W' to turn heating off, system 10 returns to state 102 and turns furnace 12 off and blower 16 off. If system 10 receives a call Y to turn cooling on while system 10 is in heating state 108, controller 20 turns furnace 12 off and turns air conditioner 14 on. Controller 20 continues to operate blower 16 in the clockwise direction at a high speed.

While system 10 is in off state 102, cooling state 106, or heating state 108, if system 10 receives a call G to circulate air, system 10 returns to spin-down state 104. In spin-down state 104, controller 20 injects a delay to allow blower 16 to come to rest. This delay may depend on the previous state of system 10. For example, if system 10 enters spin-down state 104 from off state 102, spin-down state 104 may not inject any delay as blower 16 may already be stationary when system 10 enters spin-down state 104. On the other hand, if system 10 enters spin-down state 104 from cooling state 106 or heating state 108, spin-down state 104 may inject a delay of any suitable length, e.g. 30 seconds, to allow blower 16 to come to rest before entering circulate state 110.

After spin-down state 104 has injected a suitable delay, and there is not a call W for heating or call Y for cooling present, system 10 enters circulate state 110. In circulate state 110, controller 20 operates blower 16 in a direction opposite the rotation direction of states 106 and 108. For example, if blower 16 operates in a clockwise direction in states 106 and 108, then blower 16 operates in a counter-clockwise direction in state 110. Further, in state 110, controller 20 operates blower 16 at a lower speed than the speed of blower 16 in states 106 and 108 to conserve power.

While system 10 is in circulate state 110, if system 10 receives a call G' to turn circulation off, controller 20 turns blower 16 off and system 10 returns to off state 102. Further, if system 10 receives a call W or Y for heating or cooling respectively while system 10 is in state 110, system 10 returns to spin-down state 104. In spin-down state 104, controller 20 injects a suitable delay to allow blower 16 to come to rest before exiting spin-down state 104 and entering either cooling state 106 or heating state 108. Additionally, if, while system 10 is in spin-down state 104, system 10 receives a call to turn off heating, cooling, and circulation, controller 20 turns off furnace 12, air conditioner 14, and blower 16, and returns system 10 to off state 102.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants do not invoke 35 U.S.C. § 112(f) as it exists on the date of filing hereof unless the words "means for" or "step for" are explicitly used in the particular claim.

What is claimed is:

1. A system comprising:
   a furnace;
   a blower comprising an impeller operable to draw in air along a first axis and direct the air along a second axis perpendicular to the first axis into an environment through the furnace; and
   a controller operable to:
      in response to receiving a first call to heat the environment, activate the furnace and the impeller such that the impeller turns at a first speed in a first direction causing air to be drawn into the impeller along the first axis and directed along the second axis through the furnace into the environment; and
      in response to receiving a second call to circulate air in the environment, activate the impeller such that the impeller turns at a second speed in a second direction causing air to be drawn into the impeller along the first axis and directed along the second axis into the environment while the furnace is deactivated, wherein the second speed is slower than the first speed and the second direction is opposite the first direction.

2. The system of claim 1, further comprising a sensor operable to measure a temperature of the environment wherein the controller is operable to deactivate the furnace when the temperature of the environment rises above a threshold temperature.

3. The system of claim 1, wherein the impeller is a forward curved impeller, the first direction is a clockwise direction, and the second direction is a counter-clockwise direction.

4. The system of claim 1, wherein the impeller is a backward curved impeller, the first direction is a clockwise direction, and the second direction is a counter-clockwise direction.

5. The system of claim 1, wherein if the impeller is turning in the first direction and the controller receives the second call to circulate air in the environment, the controller is further operable to reduce the impeller speed to a stop over a predetermined period of time and change the direction of the impeller from the first direction to the second direction.

6. The system of claim 1, wherein if the impeller is turning in the second direction and the interface receives the first call to heat the environment, the controller is further operable to reduce the impeller speed to a stop over a predetermined period of time and change the direction of the impeller from the second direction to the first direction.

7. The system of claim 1, further comprising an air conditioning unit, wherein
   the controller is further operable to receive a third call to cool the environment; and
   in response to receiving the third call to cool the environment, the controller is further operable to activate the air conditioning unit and the impeller such that the impeller turns at a third speed in the first direction to cool the environment.

8. A method comprising:
   receiving a first call to heat an environment,
   in response to receiving the first call to heat the environment, activate a furnace and an impeller such that the impeller turns at a first speed in a first direction causing air to be drawn into the impeller along a first axis and directed along a second axis through the furnace into the environment, the first axis perpendicular to the second axis;

receiving a second call to circulate air in the environment; and in response to receiving the second call to circulate air in the environment, activate the impeller such that the impeller turns at a second speed in a second direction causing air to be drawn into the impeller along a first axis and directed along a second axis into the environment while the furnace is deactivated, wherein the second speed is slower than the first speed and the second direction is opposite the first direction.

9. The method of claim 8, further comprising measuring a temperature of the environment and, in response to measuring a temperature above a threshold temperature, deactivating the furnace.

10. The method of claim 8, wherein the impeller is a forward curved impeller, the first direction is a clockwise direction, and the second direction is a counter-clockwise direction.

11. The method of claim 8, wherein the impeller is a backward curved impeller, the first direction is a clockwise direction, and the second direction is a counter-clockwise direction.

12. The method of claim 8, wherein if the impeller is turning in the first direction and, in response to receiving the second call to circulate air in the environment, reducing the impeller speed to a stop over a predetermined period of time and changing the direction of the impeller from the first direction to the second direction.

13. The method of claim 8, wherein if the impeller is turning in the second direction and, in response to receiving the first call to heat the environment, reducing the impeller speed to a stop over a predetermined period of time and changing the direction of the impeller from the second direction to the first direction.

14. The method of claim 8, further comprising:
receiving a third call to cool the environment; and
in response to receiving the third call to cool the environment, activating an air conditioning unit and the impeller such that the impeller turns at a third speed in the first direction to cool the environment.

15. A system comprising:
an air conditioner;
an blower comprising an impeller operable to draw in air along a first axis and direct the air along a second axis perpendicular to the first axis into an environment through the air conditioner; and
a controller operable to:
in response to receiving a first call to cool the environment, activate the air conditioner and the impeller such that the impeller turns at a first speed in a first direction causing air to be drawn into the impeller along a first axis and directed along a second axis through the air conditioner into the environment; and
in response to receiving a second call to circulate air in the environment, activate the impeller such that the impeller turns at a second speed in a second direction causing air to be drawn into the impeller along the first axis and directed along the second axis and into the environment while the air conditioner is deactivated, wherein the second speed is slower than the first speed and the second direction is opposite the first direction.

16. The system of claim 15, further comprising a sensor operable to measure a temperature of the environment wherein the controller is operable to deactivate the air conditioner when the temperature of the environment drops below a threshold temperature.

17. The system of claim 15, wherein the impeller is a forward curved impeller, the first direction is a clockwise direction, and the second direction is a counter-clockwise direction.

18. The system of claim 15, wherein the impeller is a backward curved impeller, the first direction is a clockwise direction, and the second direction is a counter-clockwise direction.

19. The system of claim 15, wherein if the impeller is turning in the first direction and the controller receives the second call to circulate air in the environment, the controller is further operable to reduce the impeller speed to a stop over a predetermined period of time and change the direction of the impeller from the first direction to the second direction.

20. The system of claim 15, wherein if the impeller is turning in the second direction and the controller receives the first call to cool the environment, the controller is further operable to reduce the impeller speed to a stop over a predetermined period of time and change the direction of the impeller from the second direction to the first direction.

* * * * *